(12) United States Patent
Horst et al.

(10) Patent No.: US 11,256,556 B2
(45) Date of Patent: Feb. 22, 2022

(54) SYSTEMS AND METHODS FOR GENERATING AN API CACHING LIBRARY USING A SHARED RESOURCE FILE

(71) Applicant: salesforce.com, inc., San Francisco, CA (US)

(72) Inventors: Justin Horst, Renton, WA (US); Jason Foreman, St. Charles, IL (US); Wesley Peter, Sammamish, WA (US); Tyson Bunch, Sacramento, CA (US); Gregory D. Loyd, Colorado Springs, CO (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/867,083

(22) Filed: May 5, 2020

(65) Prior Publication Data
US 2021/0349771 A1 Nov. 11, 2021

(51) Int. Cl.
| | | |
|---|---|---|
| *G06F 9/44* | (2018.01) | |
| *G06F 9/54* | (2006.01) | |
| *G06F 9/445* | (2018.01) | |
| *G06F 8/71* | (2018.01) | |
| *G06F 8/20* | (2018.01) | |
| *G06F 9/448* | (2018.01) | |

(Continued)

(52) U.S. Cl.
CPC .............. *G06F 9/547* (2013.01); *G06F 8/20* (2013.01); *G06F 8/30* (2013.01); *G06F 8/71* (2013.01); *G06F 9/448* (2018.02); *G06F 9/44505* (2013.01); *G06F 9/541* (2013.01); *G06F 16/9536* (2019.01); *H04L 67/06* (2013.01); *H04L 67/1097* (2013.01); *H04L 67/141* (2013.01); *H04L 67/142* (2013.01)

(58) Field of Classification Search
CPC .......... H04N 21/23109; G06F 16/2365; G06F 16/24545; G06F 16/9535; G06F 9/541; G06F 8/30; G06F 9/547; G06F 9/44505; H04L 67/06; H04L 67/1097; H04L 67/142; H04L 67/141
See application file for complete search history.

(56) References Cited

U.S. PATENT DOCUMENTS

| | | | |
|---|---|---|---|
| 10,306,442 B1 * | 5/2019 | Nuttall ................ | H04L 67/06 |
| 2015/0095923 A1 * | 4/2015 | Sarid .................. | G06F 8/30 |
| | | | 719/328 |

(Continued)

*Primary Examiner* — Tuan A Vu
(74) *Attorney, Agent, or Firm* — Sterne, Kessler, Goldstein & Fox P.L.L.C.

(57) ABSTRACT

The present disclosure is directed to systems and methods for generating an API caching library using a shared resource file. For example, a method may include: receiving, at a first platform, a shared resource file comprising metadata for declaratively deriving an application programming interface (API) caching library for a native application operating on the first platform and a corresponding application related to the native application for a second platform; parsing the shared resource file to extract the metadata at run-time of the native application; declaratively deriving the API caching library based on the extracted metadata, the declaratively deriving the API caching library comprising creating a plurality of objects that represent respective API endpoints of the API caching library; and executing a function of the native application based on at least one of the API endpoints.

20 Claims, 3 Drawing Sheets

(51) Int. Cl.
*G06F 8/30* (2018.01)
*G06F 16/9536* (2019.01)
*H04L 67/06* (2022.01)
*H04L 67/142* (2022.01)
*H04L 67/141* (2022.01)
*H04L 67/1097* (2022.01)

(56) References Cited

U.S. PATENT DOCUMENTS

| | | | |
|---|---|---|---|
| 2017/0286549 A1* | 10/2017 | Chandnani | G06F 16/9535 |
| 2019/0138633 A1* | 5/2019 | Charles | G06F 16/2365 |
| 2019/0149619 A1* | 5/2019 | Lisac | H04L 67/1097 |
| | | | 709/203 |
| 2019/0196890 A1* | 6/2019 | Bucchi | G06F 16/24545 |
| 2019/0197186 A1* | 6/2019 | Bhattacharjee | H04N 21/23109 |
| 2020/0004598 A1* | 1/2020 | Brebner | H04L 67/141 |
| 2020/0106860 A1* | 4/2020 | Sullivan | H04L 67/142 |
| 2020/0293541 A1* | 9/2020 | Pigeon | G06F 9/541 |

* cited by examiner

SYSTEMS AND METHODS FOR GENERATING AN API CACHING LIBRARY USING A SHARED RESOURCE FILE

BACKGROUND

Some applications are developed for multiple platforms. For example, applications may be developed for a web-based platform that operates on a desktop computer, tablet, laptop, or the like, as well as for a mobile-based platform, such as a native application operating a mobile device. To improve the performance and scalability of these applications, developers use caching architectures that store frequently accessed data to a storage component that is accessible to the application. Caching is frequently implemented when the application repeatedly reads the same data and/or when the original source of the data remains relatively static, slow compared to the speed of the cache, subject to a high level of contention, network latency causes the original source to be slow to respond, or the application is operating offline.

The caching architectures may be updated as features are added, deleted, or modified, where major releases are issued at regularly scheduled intervals, e.g., monthly, quarterly, three times per year, semi-annually, etc., or where patch releases may be issued on a rolling basis. For native applications, the caching architecture updates are not automatically issued to the mobile device operating the native application. Rather, a notification is sent to the mobile device notifying the user of the availability of an updated version of the native application that includes the caching architecture updates. However, some users may opt not to download the updated native application or may be prohibited from doing so due to constraints on usage of the mobile device, e.g., the mobile device may be issued by a company and the user is limited as to what changes can be made to the mobile device. In contrast, for web-based platforms, the caching architecture updates may be automatically pushed as the updates are issued. As a result, the caching architectures of the web-based platforms and the mobile-based platforms may be unsynchronized with one another.

Thus, to maintain consistency between the different platforms, a need exists to deploy the caching architecture updates to native applications that does not require the user to download an updated version of the native application.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is to be appreciated that the Detailed Description section, and not the Abstract sections, is intended to be used to interpret the claims. The Summary and Abstract sections may set forth one or more but not all example embodiments as contemplated by the inventor(s), and thus, are not intended to limit the appended claims in any way.

The present disclosure is directed to generating an API caching library using a shared resource file. For example, the API caching library may be generated using a caching architecture that is fully declarative and can change caching behavior of a native application operating on a device with a push of a shared resource file without updating the native application. This allows the native application to maintain the same behavior as a web platform version of the application, while still remaining fully native. A caching engine on the device can receive the shared resource file from a server, parse the shared resource file to extract data from the shared resource file which instructs the native application how to declaratively derive the API caching library. Because the caching engine generates the API caching library declaratively, rather than imperatively, the native application does not require any updates to add, remove, and/or modify which resources and endpoints the native application can interact with. Instead, the native application can be completely driven by the content of the shared resource file.

Figure 1:
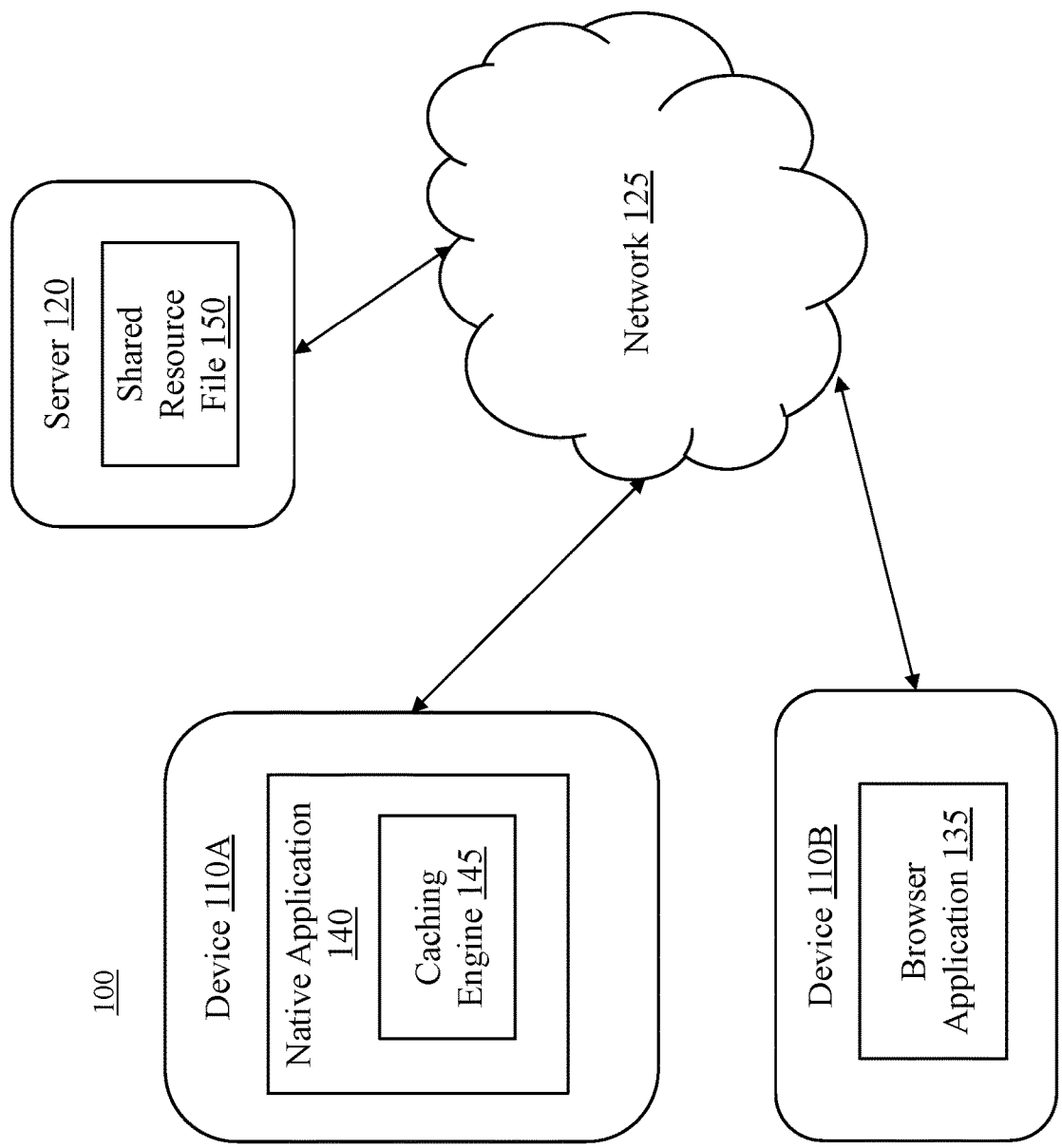
FIG. 1 is a block diagram of a system, according to some example embodiments.

FIG. 1 is a diagram of an example environment 100 in which example systems and/or methods may be implemented. As shown in FIG. 1, environment 100 may include devices 110A, 110B, a server 120, and a network 125. Devices of the environment 100 may interconnect via wired connections, wireless connections, or a combination of wired and wireless connections. Devices of environment 100 may include a computer system 300 shown in FIG. 3, discussed in greater detail below. The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

In some embodiments, the device 110A may be, for example, a mobile phone (e.g., a smart phone, a radiotelephone, etc.), a handheld computer, a gaming device, a wearable communication device (e.g., a smart wristwatch, a pair of smart eyeglasses, etc.), or a similar type of device that is configured to operate an application, such as a native application 140 described herein. The device 110B may be a desktop computer, a laptop computer, a tablet computer, or a similar type of device that is configured to operating a browser application 135 described herein.

The server 120 may include a server device (e.g., a host server, a web server, an application server, etc.), a data center device, or a similar device, capable of communicating with the computing device 110 via the network 125. The network 125 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

In some embodiments, the server 120 may store a shared resource file 150 that is used by both browser application 135 operating on the device 110B and the native application 140 operating on the device 110A. The shared resource file 150 may be received by the server 120 via a user interface of the server 120 or via a remote computing device, such as devices 110A, 110B, as should be understood by those of ordinary skill in the art. For example, a developer may generate the shared resource file 150 using the user interface of the server 120, which may then store the shared resource 150. Alternatively, the developer may generate the shared resource file 150 using the remote computing device, which may be used to transmit the shared resource file 150 to the server 120.

In some embodiments, the shared resource file 150 may be a RESTful API Modeling Language (RAML) file that includes metadata for generating an API caching library. The metadata may be used by the native application 140 and the browser application 135 to declaratively derive the API caching library. That is, the native application 140 and the browser application 135 use the same shared resource file 150 to declaratively derive their respective API caching libraries. The use of the same shared resource file 150 by both the native application 140 and the browser application 135 enables the API caching libraries of each to remain synchronized with one another, without the need to download an updated version of the native application 140.

In some embodiments, the metadata may define a shape and semantics of the API caching library. The shape may include, for example, paths to different caching resources (e.g., API endpoints) and a description of each caching resource. In some embodiments, the shape may include, but not limited to: 1) a structure of the API caching library, e.g., paths between the different caching resources; 2) relationships between hardware and the caching resources; 3) relationships between the caching resources at any given time; and 4) a description of the caching resources. It should be understood by those of ordinary skill in the art that these are merely examples different shapes of the API caching library, and that other shapes are further contemplated in accordance with aspects of the present disclosure.

The semantics may include, for example, the respective behaviors of caching resources, e.g., what to expect in a success scenario when executing a function and what to expect in a failure scenario when executing the function. In some embodiments, the semantics may include, but are not limited to: 1) a functionality the caching resources; 2) a workflow between the caching resources; 3) behavior of the caching resources based on their current state; 4) a sequence of when and how the caching resources interact with one other; 5) a flow of communications between the caching resources; and 6) the behavior of the caching resources within a specified time frame. It should be understood by those of ordinary skill in the art that these are merely examples different semantics, and that other semantics are further contemplated in accordance with aspects of the present disclosure.

In some embodiments, the shared resource file 150 may also include one or more annotations that further define the API caching library. For example, the annotations may be used to define custom properties for the shared resource file 150, such as instructions for processing tasks that are outside the scope of the shared resource file 150. For example, the annotations may include information defining how data should be handled, e.g., merged versus overwritten, or information defining how to generate look-up keys or the like. As another example, the annotations may be used to extend the shared resource file 150 to support third-party vendor needs without changing the shared resource file 150. In this way, the annotations may be used to meet specialized, use-case needs. As yet another example, the annotations may be used to define where to find data in a response, e.g., where to find hypermedia in a JSON response, and how the native application 140 and the browser application 135 should process the data in the response. In this way, the annotations provide a mechanism to extend the shared resource file 150 with additional information.

Figure 2:
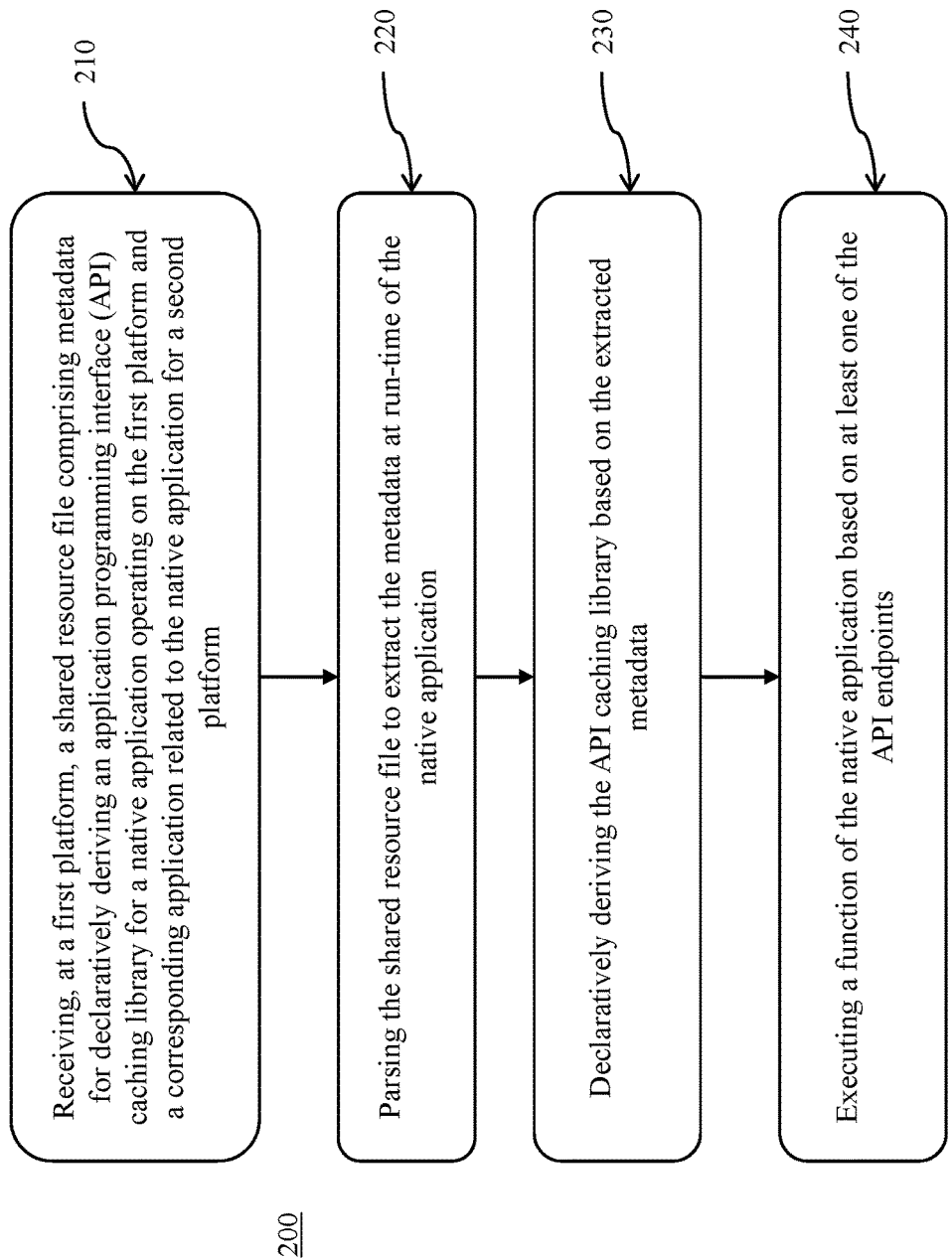
FIG. 2 is a flowchart illustrating a process for generating an API caching library using a shared resource file, according to some example embodiments.

FIG. 2 is a flow chart of an example method 200 for generating an API caching library using a shared resource file. In some embodiments, one or more processes described with respect to FIG. 2 may be performed by the device 110A of FIG. 1.

At 210, the method 200 may include receiving, at the device 110A, the shared resource file 150 comprising metadata for declaratively deriving the API caching library. In some embodiments, the shared resource file 150 may also be received by the device 110B. As such, the shared resource file 150 may be used by both the native application 140 operating on a first platform, e.g., the device 110A, and the browser application 135 operating on a second platform, e.g., the device 110B, to declaratively derive the API caching library.

In some embodiments, the shared resource file 150, including the annotations, may be transmitted from the server 120 to the devices 110A, 110B to initialize the API caching library and when an update is made to the shared resource file 150. For example, changes to the shared resource file 150, e.g., additions, deletions, and/or modifications to the caching resources, may be deployed at scheduled release dates or on a rolling basis, i.e., as the changes to the shared resource file 150 are made. In some embodiments, the changes to the shared resource file 150 may deployed to the native application 140 without requiring an update to the version of the native application 140. In some embodiments, the shared resource file 150 may be deployed by the server 120 to the device 110A at runtime of the native application 140.

In some embodiments, at 220, method 200 may include parsing the shared resource file to extract the metadata at run-time of the native application 140. For example, at runtime of the native application 140 and in response to receiving the shared resource file 150, a caching engine 145 of the native application 140 may parse the shared resource file 150 to declaratively derive the API caching library. To achieve this, the caching engine 145 may parse the metadata to extract the shape and semantics of the API caching library. The caching engine 145 may then normalize and de-normalize the shape and semantics. By normalizing and de-normalizing the shape and semantics, the caching engine 145 can reorganize the shape and semantics in a manner that enables to the device 110A to provide a consistent view of data across several different responses.

In some embodiments, at 230, method 200 may include declaratively deriving, using the caching engine 145, the API caching library based on the extracted metadata, e.g., the extract shape and semantics. In some embodiments, declaratively deriving the API caching library may include creating a plurality of objects that represent respective API endpoints of the API caching library. Additionally, in some embodiments, the caching engine 145 may extract information described in the annotations and declaratively derive the API caching library based on the information from the annotations in addition to the extracted metadata.

In some embodiments, at 240, method 200 may include executing a function of the native application 140 based on at least one of the API endpoints. For example, the device 110A may execute a function of the native application 140 based on at least one of the API endpoints. In some embodiments, the native application 140 may receive a request to execute a function via a user interface, e.g., a user may select an icon of the native application 140. In response to receiving the request and based on the API caching library, the native application 140 may identify which API endpoint is responsible for executing the function and request that the identify API endpoint execute the function.

Figure 3:
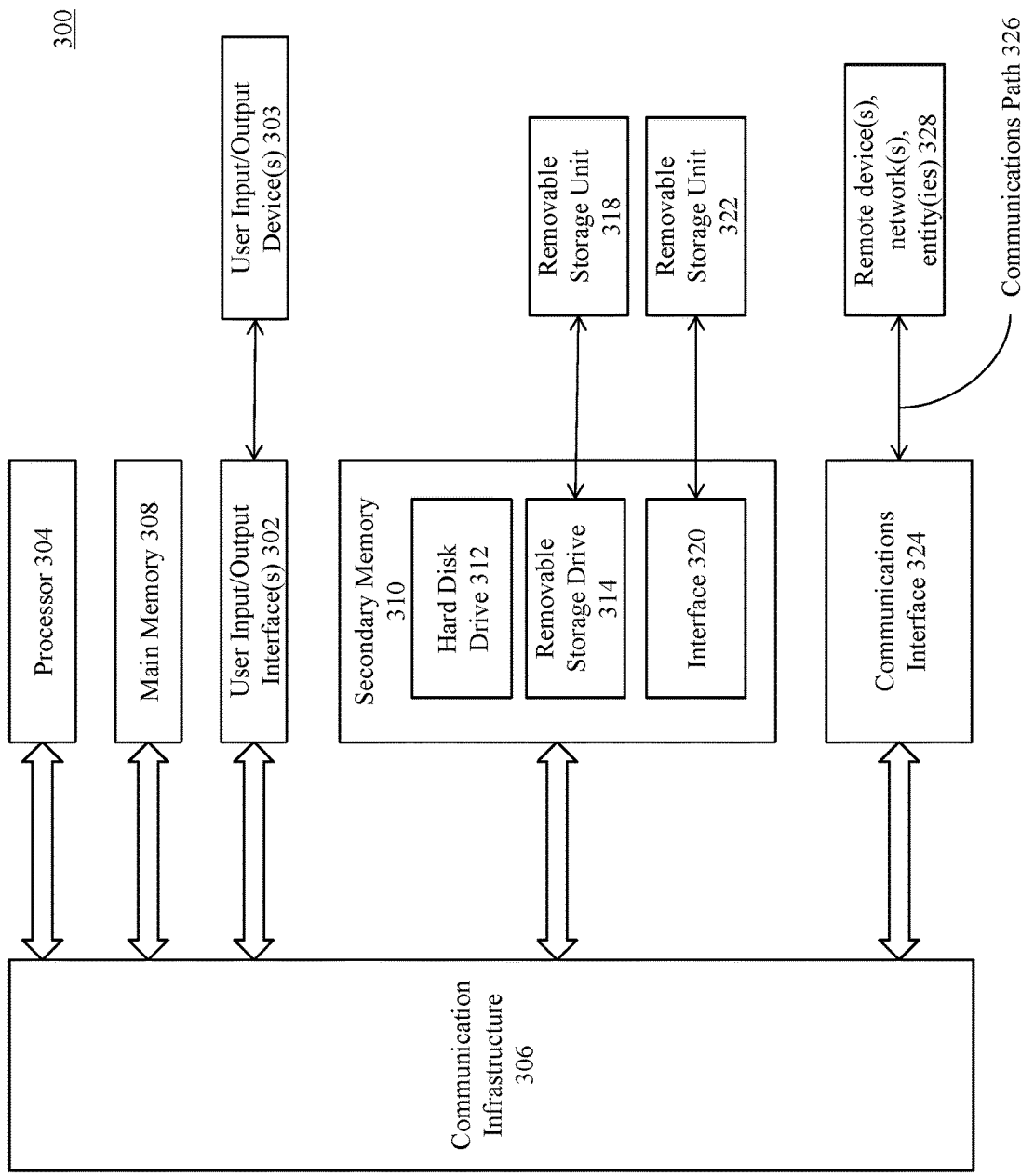
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system embodiments other than those described herein.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

The foregoing description of the example embodiments will so fully reveal the general nature of the invention that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described example embodiments, but should be defined only in accordance with the following claims and their equivalents.

What is claimed is:

1. A computer-implemented method, comprising:
   receiving, at a first platform, a shared resource file comprising metadata for declaratively deriving an application programming interface (API) caching library usable by a native application operating on the first platform to declaratively configure caching resources comprising API endpoints;
   parsing, by a caching engine at the first platform, the shared resource file to extract the metadata at run-time of the native application;
   declaratively deriving the API caching library based on the extracted metadata, wherein the declaratively deriving the API caching library comprises creating a plurality of objects that represent respective ones of the API endpoints of the API caching library corresponding to the caching resources, wherein the extracted metadata is configured for use by a browser application for a second platform that is related to the native application to declaratively configure corresponding caching resources; and
   executing a function of the native application by identifying at least one of the API endpoints responsible for executing the function and requesting that the at least one of the API endpoints execute the function.

2. The method of claim 1, wherein the shared resource file comprises a RESTful API Modeling Language (RAML) file.

3. The method of claim 2, wherein the RAML file comprises a plurality of annotations related to the API caching library.

4. The method of claim 2, wherein the RAML file defines respective shapes and semantics of the API caching library.

5. The method of claim 1, wherein the first platform comprises a mobile device platform and the second platform comprises a web-based platform.

6. The method of claim 1, further comprising:
   receiving an updated shared resource file indicating one or more additions, deletions, or modifications to the metadata; and
   updating the API caching library based on the updated shared resource file.

7. The method of claim 6, wherein the updated share resource file is received on a rolling basis without updating a version of the native application.

8. A device, comprising:
   a memory; and
   a processor coupled to the memory and configured to perform operations comprising:
     receiving a shared resource file comprising metadata for declaratively deriving an application programming interface (API) caching library usable by a native application operating on a first platform of the device to declaratively configure caching resources comprising API endpoints;
     parsing, by a caching engine at the first platform, the shared resource file to extract the metadata at run-time of the native application;
     declaratively deriving the API caching library based on the extracted metadata, wherein the declaratively deriving the API caching library comprises creating a plurality of objects that represent respective ones of the API endpoints of the API caching library corresponding to the caching resources, wherein the extracted metadata is configured for use by a browser application for a second platform that is related to the native application to declaratively configure corresponding caching resources; and
     executing a function of the native application by identifying at least one of the API endpoints responsible for executing the function and requesting that the at least one of the API endpoints execute the function.

9. The device of claim 8, wherein the shared resource file comprises a RESTful API Modeling Language (RAML) file.

10. The device of claim 9, wherein the RAML file comprises a plurality of annotations related to the API caching library.

11. The device of claim 9, wherein the RAML file defines shapes and semantics of the API caching library.

12. The device of claim 8, wherein the first platform comprises a mobile device platform and the second platform comprises a web-based platform.

13. The device of claim 8, wherein the processor is further configured to perform operations comprising:
   receiving an updated shared resource file indicating one or more additions, deletions, or modifications to the metadata; and update the API caching library based on the updated shared resource file.

14. The device of claim 8, wherein the updated share resource file is received on a rolling basis without updating a version of the native application.

15. A non-transitory computer-readable device having instructions stored thereon that, when executed by at least one computing device, cause the at least one computing device to perform operations comprising:
   receiving, at a first platform, a shared resource file comprising metadata for declaratively deriving an application programming interface (API) caching library usable by a native application operating on the first platform to declaratively configure caching resources comprising API endpoints;

parsing, by a caching engine at the first platform, the shared resource file to extract the metadata at run-time of the native application;

declaratively deriving the API caching library based on the extracted metadata, wherein the declaratively deriving the API caching library comprises creating a plurality of objects that represent respective ones of the API endpoints of the API caching library corresponding to the caching resources, wherein the extracted metadata is configured for use by a browser application for a second platform that is related to the native application to declaratively configure corresponding caching resources; and executing a function of the native application by identifying at least one of the API endpoints responsible for executing the function and requesting that the at least one of the API endpoints execute the function.

16. The non-transitory computer-readable device of claim 15, wherein the shared resource file comprises a RESTful API Modeling Language (RAML) file.

17. The non-transitory computer-readable device of claim 16, wherein the RAML file comprises a plurality of annotations related to caching resources for the native application.

18. The non-transitory computer-readable device of claim 16, wherein the RAML file defines shapes and semantics of the API caching library.

19. The non-transitory computer-readable device of claim 15, wherein the first platform comprises a mobile device platform and the second platform comprises a web-based platform.

20. The non-transitory computer-readable device of claim 15, the operations further comprising:

receiving, without updating a version of the native application, an updated shared resource file indicating one or more additions, deletions, or modifications to the metadata; and updating the API caching library based on the updated shared resource file.

* * * * *